United States Patent [19]

Dobberpuhl

[11] 4,139,064

[45] Feb. 13, 1979

[54] ROTARY TILLER AND BELT GUARD MOUNTING THEREFOR

[75] Inventor: Dale R. Dobberpuhl, Horicon, Wis.

[73] Assignee: Deere & Company, Moline, Ill.

[21] Appl. No.: 881,408

[22] Filed: Feb. 21, 1978

[51] Int. Cl.$^2$ .................. B62D 51/04; A01B 33/04
[52] U.S. Cl. ....................... 172/43; 74/242.13 R; 74/242.15 R; 74/611; 172/125; 180/19 R; 180/64 MM
[58] Field of Search ............... 172/42, 43, 125, 256, 172/257, 258, 259, 260; 74/242.13 R, 242.13 A, 242.15 R, 611; 180/19 R, 19 S, 19 H, 64 MM; 37/53; 56/11.6

[56] References Cited

U.S. PATENT DOCUMENTS

| | | | |
|---|---|---|---|
| 659,235 | 10/1900 | Jeffery | 74/611 |
| 2,545,781 | 3/1951 | Hesterberg | 180/19 R |
| 2,572,109 | 10/1951 | Coates | 180/19 R |
| 3,180,428 | 4/1965 | Price | 172/42 |
| 4,023,428 | 5/1977 | Dysard | 74/242.13 R |

FOREIGN PATENT DOCUMENTS 607724 11/1960 Canada ..................... 180/64 MM

*Primary Examiner*—Richard T. Stouffer

[57] ABSTRACT

A walk-behind rotary tiller includes an engine having an output shaft on which is mounted a first pulley. A second pulley is mounted on a countershaft and connected to be driven from the first pulley by a drive belt. The engine is mounted for adjustment toward and away from the counter shaft to compensate for belt stretch and to facilitate belt replacement. A guard encloses the belt and has its forward end pivotally supported on a bracket fixed to the engine by a fastener which also serves to retain a belt guide in place. The rear end of the belt guard is supported for swinging about the forward connection, when the motor is adjusted, by a bent rod having one end pivotally received in the guard and a parallel, axially offset second end serving to pivotally connect a bracket, having a drag stake and wheel assembly fixed thereto, for movement between raised and lowered positions for respectively disposing the drag stake and wheel assembly in transport and working positions.

2 Claims, 2 Drawing Figures

ROTARY TILLER AND BELT GUARD MOUNTING THEREFOR

BACKGROUND OF THE INVENTION

The present invention relates to walk-behind rotary tillers and more particularly relates to belt guard mountings for such tillers.

Under consideration here are relatively light weight tillers of a type including a narrow, generally horizontal, fore-and-aft extending main frame having an engine mounted on the forward end thereof for fore-and-aft movement to adjust the center distance between a first pulley carried on an output shaft of the engine and a second pulley carried by a counter shaft rotatably mounted in a chain case fixed to the frame. A guard or shield encloses at least a portion of the drive composed of the first and second pulleys and the drive belt in order to prevent accidental engagement therewith by and possible injury to anyone who, in the absence of such a guard or shield, might come into contact with the drive portion when it is being operated. While the operation of these belt guards has been generally satisfactory, the mountings of the belt guards have not lent to the judicious use of mounting parts and/or guard material.

SUMMARY OF THE INVENTION

According to the present invention, there is provided a novelly mounted belt guard for a walk-behind tiller.

A broad object of the invention is to provide a tiller having a belt guard mounted with a minimum of parts.

A more specific object of the invention is to provide a tiller having a belt guard, as set forth in the preceding object, wherein the parts used for mounting the belt guard include parts for mounting other tiller components.

Another object of the invention is to provide a tiller having a belt guard mounted such that its rear end swings vertically when the tiller engine is shifted fore-and-aft to thereby permit a tiller component to be located adjacent the rear end of the guard with the clearance between the guard and component changing very little throughout the fore-and-aft adjustment of the engine.

These and other objects will become apparent from a reading of the ensuing description together with the appended drawings.

DESCRIPTION OF THE PREFERRED EMBODIMENT

Figure 1:
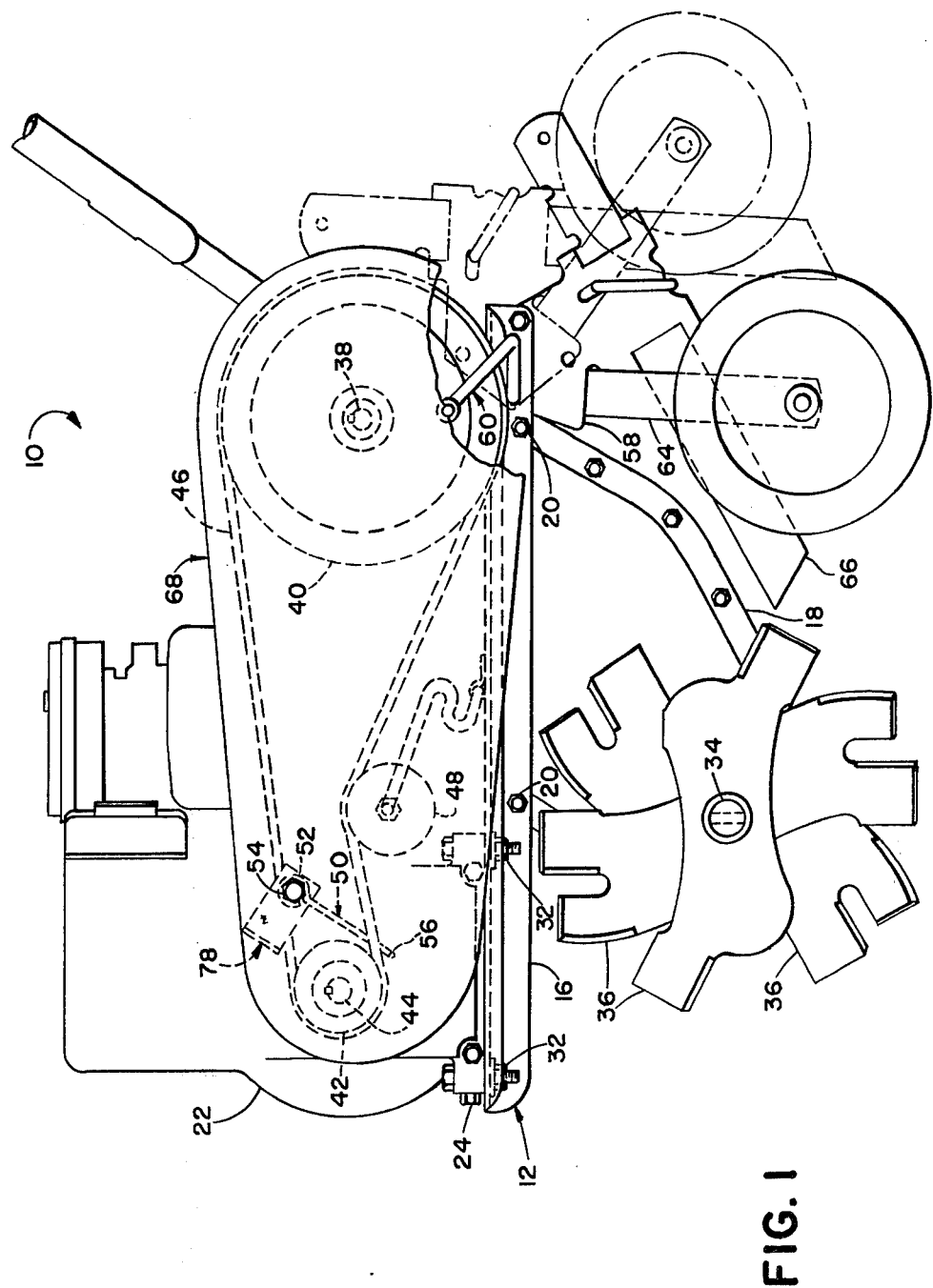
FIG. 1 is a left side elevational view of a walk-behind rotary tiller embodying a drive belt guard mounted according to the principles of the present invention.

Referring now to the drawings, therein is shown a walk-behind rotary tiller 10 including a frame 12 composed of right and left channel members 14 and 16 bolted to the opposite sides of a chain case 18 by means of bolts 20 which also serve in conjunction with other bolts to fix opposite halves of the chain case 18 together. Mounted on the forward end portion of the frame 12 is an engine 22 having a rectangular base 24 positioned with corners at its right side located directly above fore-and-aft elongated holes 26 provided in the right channel member 14 and with corners at its left side located directly above fore-and-aft elongated holes 28 provided in the left channel member 16. Each of the corners of the base 24 is provided with a vertical hole and a bolt 30 is received in each hole with the bolts on the right side also being received in the holes 26 and with the bolts on the left side also being received in the holes 28. Nuts 32 are received on the bottom ends of the bolts 30 and are drawn tight against the frame 12 to hold the engine 22 in a desired position of fore-and-aft adjustment within the limits of the holes 26 and 28. The purpose for the adjustment is set forth herein below.

The chain case 18 inclines downwardly and forwardly between a rear end, which is elevated above a rear end portion of the frame 12, and a front end, which is located beneath the forward end portion of the frame. Mounted in the front end of the chain case 18 is a shaft 34 on which is mounted a plurality of tines 36. A chain and sprocket drive (not shown) is located internally of the chain case 18 and couples the shaft 34 for being driven from a counter shaft 38 rotatably mounted in the rear end of the chain case. A pulley 40 is fixed on the left end of the counter shaft 38 in fore-and-aft alignment with a pulley 42 fixed on an output shaft 44 of the engine 22. A drive belt 46 is trained about the pulleys 40 and 42 for transferring driving torque from the pulley 42 to the pulley 40 when an idler pulley 48 is engaged with the lower run of the belt 46 to tighten the belt as shown in FIG. 1. An actuator (not shown) would normally be provided for moving the idler pulley between the position shown and a position spaced in a direction away from the belt 46 wherein the belt is permitted to assume a slack, non-driving condition. The aforesaid adjustability of the engine 22 permits the latter to be shifted forwardly to compensate for belt stretch or to be shifted rearwardly to facilitate replacement of the belt. To prevent the left end of the belt from accidentally jumping off the pulley 42 when the idler pulley 48 is positioned to allow the belt 46 to become slack or to keep the left end of a newly replaced belt properly aligned for engagement with the pulley 42 when the engine 22 is again shifted forwardly to take up excess belt slack, a belt guide 50 is provided. Specifically, the guide 50 is composed of a rod bent to form a mounting eye 52 and a cap screw 54 is received in the eye and in a hole provided in the engine 22 so as to hold the guide in place. An intermediate portion of the guide 50 joins the eye 52 with a transverse end portion 56 positioned beneath the lower run of the belt 46 at a location adjacent the pulley 42.

Figure 2:
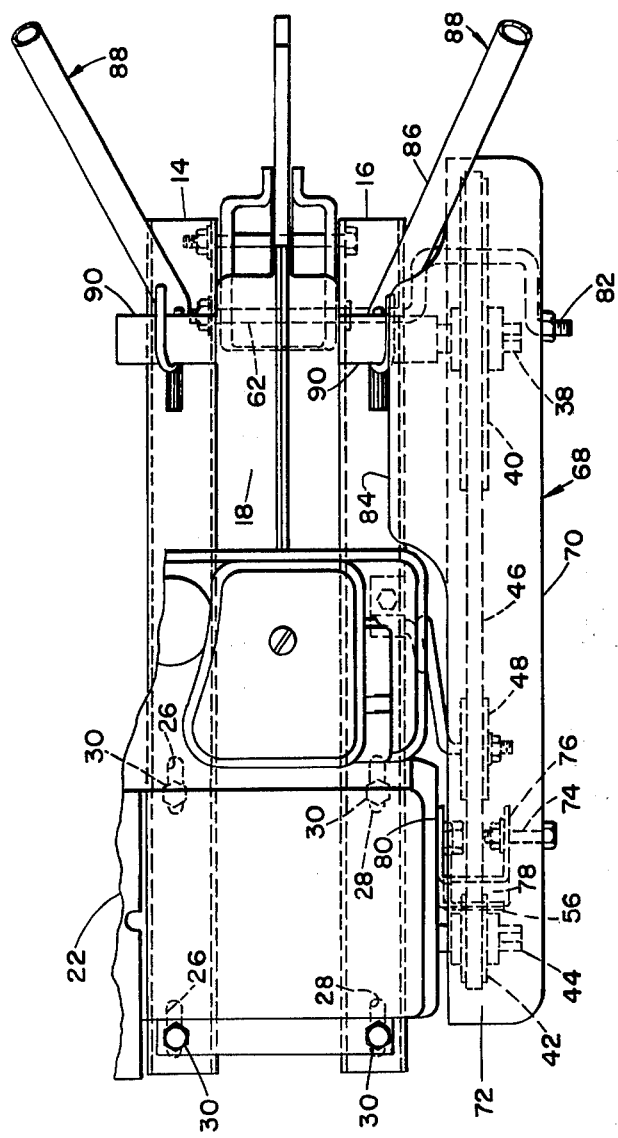
FIG. 2 is top plan view of the rotary tiller illustrated in FIG. 1 but with parts omitted and broken away for clarity and simplicity.

A mounting bracket 56 is located between the rear ends of the channel members 14 and 16 and is pivotally mounted thereto by a pivot rod 60 having a first transverse end section 62 (FIG. 2) received in aligned holes provided in the bracket 56 and members 14 and 16. Fixed to the bracket for movement therewith is a wheel assembly 64 and a drag stake 66. The bracket 56 is illustrated (FIG. 1) in solid lines in a lowered position wherein the wheel assembly 64 and drag stake 66 are disposed in respective transport positions and in dashed lines in a raised position wherein the wheel assembly 64 and drag stake 66 are disposed in respective working positions.

A belt guard 68, provided for the purpose of preventing anyone from accidentally contacting that portion of the tiller drive including the pulleys 40 and 42 and the belt 46, is mounted on the tiller by means including the capscrew 54 used for securing the belt guide 50 in place and the pivot rod 60 used for securing the bracket 58 in place. Specifically, the belt guard 68 includes a vertical side wall 70 disposed just leftwardly of the pulleys 40 and 42 and the belt 46 and having a flange 72 joined thereto and curved arcuately about front and rear portions respectively of the pulleys 42 and 40 and extending fore-and-aft above the upper run of the belt 46. A fastener 74 extends transversely through the wall 70 and pivotally mounts the forward end of the guard to an outer leg 76 of a U-shaped bracket 78 having an inner leg 80 fixed to the engine 22 by means, including the capscrew 54. The rear end portion of the guard 68 is supported for swinging vertically about the fastener 74, when the engine 22 is adjusted fore-and-aft, by means of the pivot rod 60. Specifically, the rod 60 includes a second transverse end section 82 disposed parallel to and offset axially from the first end section 62, the section 82 being received in the guard side wall 70 at a location above that where the end section 62 is received in the frame 12. Thus, it will be appreciated that as the engine 22 is adjusted forwardly the guard 68 will follow resulting in the rear end thereof being guided downwardly about the fastener 74 by the rod 60, and, as the engine is adjusted rearwardly the rod 60 will lift the rear end of the guard 68 about the fastener 74.

It is significant to note that the pivotal mounting of the guard 68 has the benefit that the fore-and-aft dimension of the guard may be less than would be necessary if the guard shifted fore-and-aft with the engine 14. A further benefit accruing from the pivotal mounting of the guard 68 can be seen in FIG. 2 wherein a leftwardly stepped section 84 of the guard flange 72 is shown with forward and rear edges thereof respectively disposed closely adjacent to a rear side portion of the engine and a left leg 86 of an operator handle 88 having opposite legs respectively fixed to cylindrical members 90 fixed to opposite sides of the chain case 18. Thus, it will be appreciated that the spacing between the stepped section 84 and the engine 22 and handle leg 86 would have to be greater if it weren't for the pivotal mounting of the guard 68 with the greater space affording easier access to the drive elements than is present in applicant's design.

The operation of the guard mounting is thought to be clearly apparent from the foregoing description and for the sake of brevity no additional description of the operation is given.

I claim:

1. In a walk-behind rotary tiller including an engine including an output shaft having a first pulley mounted thereon; a counter shaft arranged parallel to the output shaft and having a second pulley mounted thereon, a generally horizontal, fore-and-aft extending main frame supporting said engine on a forward portion thereof and said counter shaft on a rearward portion thereof with the engine being releasably mounted for movement toward and away from the countershaft to adjust the center distance between the first and second pulleys, a drive belt trained about the first and second pulleys, a belt guard including a vertical wall located transversely outwardly of the first and second pulleys and the belt and a flange extending inwardly from the vertical wall and extending arcuately respectively forwardly of the first pulley and rearwardly of the second pulley and fore-and-aft above the belt, and a first fastener for vertically pivotally mounting a ground engaging member to the frame at a location below the counter shaft, an improved mounting for supporting the belt guard on the frame, comprising: a connection means pivotally connecting the forward end of the guard to the engine; and said first fastener being in the form of a bent rod having first and second parallel, transverse, axially misaligned end sections with the first end section being pivotally received in the ground engaging member and the frame and with the second end section being pivotally received in the belt guard whereby the belt guard will pivot at said connection means when the engine is adjusted toward or away from the counter shaft.

2. The walk-behind tiller defined in claim 1 wherein said connection means includes a bracket fixed to the engine by a second fastener; and a belt guide being held in place adjacent the engine by said second fastener.

* * * * *